US007900260B2

(12) United States Patent
Hirst

(10) Patent No.: US 7,900,260 B2
(45) Date of Patent: Mar. 1, 2011

(54) METHOD FOR LIFETIME TRACKING OF INTELLECTUAL PROPERTY

(75) Inventor: Roy Hirst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1550 days.

(21) Appl. No.: 10/729,798

(22) Filed: Dec. 5, 2003

(65) Prior Publication Data

US 2005/0125352 A1    Jun. 9, 2005

(51) Int. Cl.
*H04N 7/16* (2006.01)

(52) U.S. Cl. ........................................................ 726/26

(58) Field of Classification Search .................. 380/231
See application file for complete search history.

(56) References Cited

U.S. PATENT DOCUMENTS

| | | | | |
|---|---|---|---|---|
| 5,845,090 A * | 12/1998 | Collins et al. | ................ | 709/221 |
| 5,897,643 A * | 4/1999 | Matsumoto | .................. | 715/234 |
| 6,052,780 A * | 4/2000 | Glover | ........................ | 713/193 |
| 6,134,324 A * | 10/2000 | Bohannon et al. | ............. | 705/52 |
| 6,141,681 A * | 10/2000 | Kyle | ........................... | 709/206 |
| 6,327,652 B1 | 12/2001 | England et al. | | |
| 6,330,670 B1 * | 12/2001 | England et al. | .................. | 713/2 |
| 6,574,611 B1 * | 6/2003 | Matsuyama et al. | ........... | 705/57 |
| 6,691,229 B1 * | 2/2004 | Nelson | ........................ | 713/193 |
| 6,772,340 B1 | 8/2004 | Peinado et al. | | |
| 6,775,655 B1 | 8/2004 | Peinado et al. | | |
| 7,039,806 B1 * | 5/2006 | Friedman et al. | ............. | 713/170 |
| 7,466,823 B2 * | 12/2008 | Vestergaard et al. | ........ | 380/227 |
| 2002/0077985 A1 * | 6/2002 | Kobata et al. | .................. | 705/51 |
| 2002/0141582 A1 * | 10/2002 | Kocher et al. | ............... | 380/201 |
| 2002/0186844 A1 * | 12/2002 | Levy et al. | .................. | 380/231 |
| 2003/0048922 A1 * | 3/2003 | Rhoads | ........................ | 382/100 |
| 2003/0149890 A1 * | 8/2003 | Shen et al. | ................... | 713/200 |
| 2003/0152225 A1 * | 8/2003 | Kunisa | ........................ | 380/210 |
| 2003/0225701 A1 * | 12/2003 | Lee et al. | ........................ | 705/57 |
| 2004/0044629 A1 * | 3/2004 | Rhodes et al. | ................. | 705/59 |
| 2004/0103295 A1 * | 5/2004 | Gustafsson | .................. | 713/200 |
| 2004/0111613 A1 * | 6/2004 | Shen-Orr et al. | ............. | 713/165 |
| 2004/0240705 A1 * | 12/2004 | Lubin et al. | ............... | 382/100 |
| 2005/0058318 A1 * | 3/2005 | Rhoads | ........................ | 382/100 |
| 2006/0101521 A1 * | 5/2006 | Rabinovitch | .................. | 726/26 |
| 2006/0188128 A1 * | 8/2006 | Rhoads | ........................ | 382/100 |
| 2006/0193492 A1 * | 8/2006 | Kuzmich et al. | ............. | 382/100 |
| 2006/0247934 A1 * | 11/2006 | Umehara et al. | ............... | 705/1 |
| 2007/0052560 A1 * | 3/2007 | Van Der Veen et al. | ........ | 341/51 |
| 2008/0072040 A1 * | 3/2008 | Asano et al. | ................ | 713/158 |

\* cited by examiner

*Primary Examiner*—David J Pearson
(74) *Attorney, Agent, or Firm*—Workman Nydegger

(57) ABSTRACT

A method of storing and tracking digitally-encoded material includes associating a unique identifier with the digitally-encoded material, associating one or more built-in functions with the digitally-encoded material so that the unique identifier and the built-in functions are coupled to the digitally-encoded material. The built-in functions can govern transforms and rendering of the digitally-encoded material. The tracking is performed by associating a history of the digitally-encoded material with the digitally-encoded material. The history can be associated with the digitally-encoded material or kept in a database that communicates with the digitally-encoded material via the identifier. The built-in functions enable the digitally-encoded material to be stored in RAM in an encrypted form. A method for tracking can include encrypting a combination including the digitally-encoded material and the unique identifier and appending built-in function source code and the encrypted combination to form an executable entity executable independent of any particular operating system.

23 Claims, 4 Drawing Sheets

US 7,900,260 B2

METHOD FOR LIFETIME TRACKING OF INTELLECTUAL PROPERTY

TECHNICAL FIELD

This invention relates generally to computing and, more particularly, relates to protection and tracking of information distributed in electronic form.

BACKGROUND OF THE INVENTION

Great amounts of information are transferred by computer systems in the form of files. Once in the form of a computer files, this information can easily be spread to a vast number of people quickly and easily.

In many cases the information is sensitive in nature. Examples of this include information which is proprietary to a company, government information, or personnel information such as social security numbers and credit card numbers. Methods exist for protecting such data such as encrypting the data. Data encryption requires that the person trying to access the file have the proper key or password to decrypt the file.

Even with encryption, information can still be spread with the knowledge of the originating party. Encryption is never stronger than the good intentions of those who have the password. Therefore, a need exists for a system which would allow the creator of a document to track the spread of the document that does not require a password.

SUMMARY OF THE INVENTION

The invention consists of an entity that combines digitally-encoded material, a unique identifier, and built-in functions. The digitally encoded material may be any form of digital data including pictures, documents, movies, spreadsheets, or any other form of data. The unique identifier is a number created using an algorithm which virtually guarantees that the same number will never be created twice. This algorithm will often use such information as the time, date, filenames, MAC addresses, and processor serial numbers to as inputs in generating the unique number. The built-in functions are executable programs which might contain, for example, programs to decrypt, copy, print, generate new unique ID's, or encrypt the file.

The three components listed above work together to provide protection of the digital information. The combination of the digitally encoded data along with a unique identifier, built-in functions, and possibly other components such as the document history are referred to as a three component document. In one embodiment, the three components could exist in a single file or document. The unique ID is used to identify the file. Once encoded, the unique ID will remain unchanged for the lifetime of the file, therefore providing an unambiguous identification. The built-in functions are used to perform several operations on the file, typical among these would be to copy, print, encrypt, and decrypt the file. Although the normal copy routines available with most operating systems could be used to copy the file, these functions would not be able to decrypt the file and would therefore not provide a useful copy. By using built-in functions, records of copies can be kept. For example, the built-in copy function could be designed to produce an additional unique ID and place this in the copy, notify the document originator that a copy had been made, and record the history of copies within the file.

By notifying the document creator that a copy had been made, the information contained in the file is offered an additional level of protection. Other advantages offered by the use of built-in functions in conjunction with a unique ID include the ability to prevent copies of files from functioning in a different location, increased flexibility of licensed products, simplified document change tracking, document version control, and well as stronger security.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
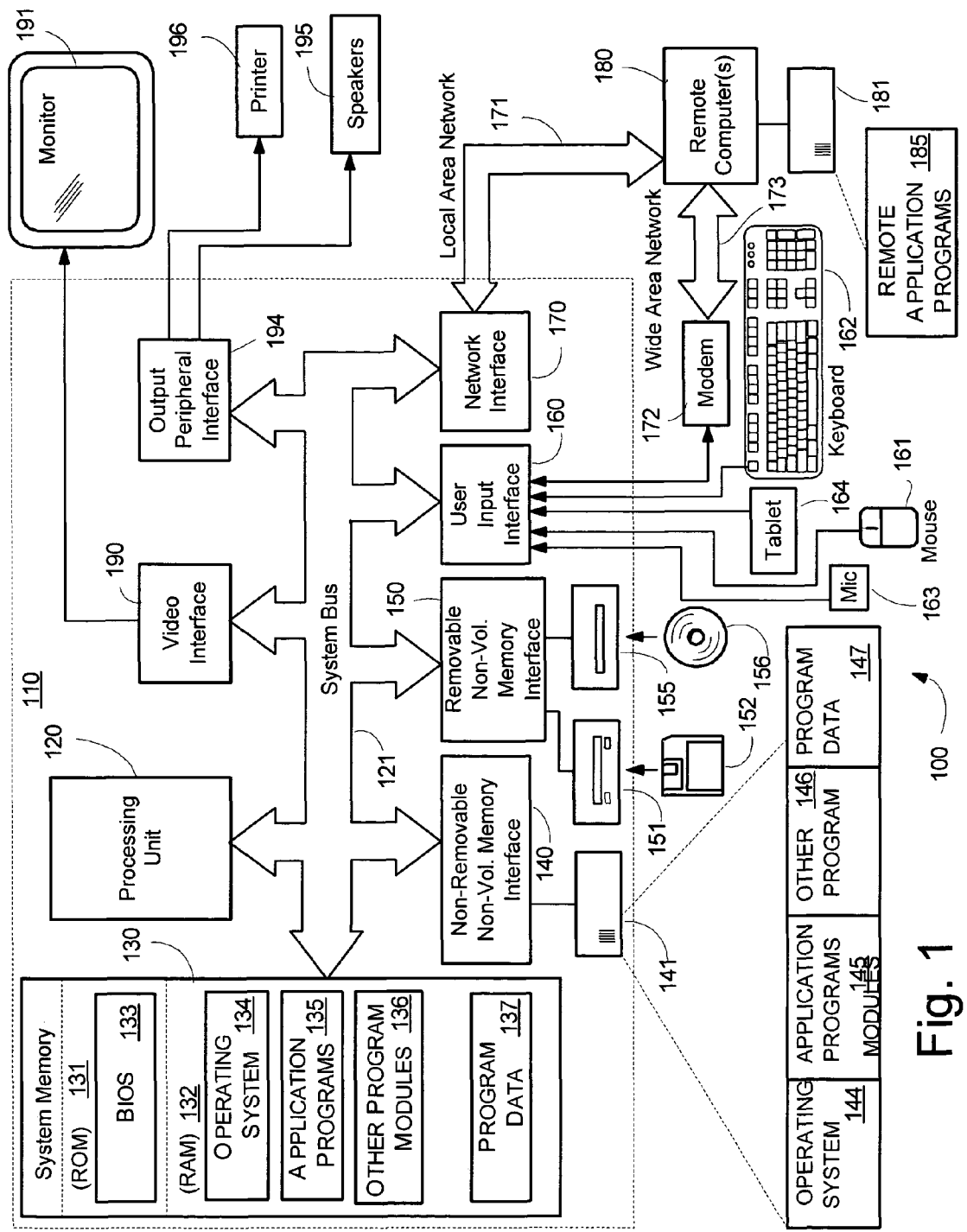
FIG. 1 is a block diagram generally illustrating an exemplary computing system with which the present invention can be implemented.

Turning to FIG. 1, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not equivalent to any of the computing devices 10-17 illustrated in FIG. 1. The exemplary computing device 100 can implement one or more of the computing devices 10-17, such as through memory partitions, virtual machines, or similar programming techniques allowing one physical computing structure to perform the actions described below as attributed to multiple structures.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 100 may also include other removable/non-removable, volatile/nonvolatile computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 operates in a networked environment, such as that shown in FIG. 1, using logical connections to one or more remote computers. FIG. 1 illustrates a general network connection 171 to a remote computing device 180. The general network connection 171 can be any of various different types of network connections, including a Local Area Network (LAN), a Wide-Area Network (WAN), networks conforming to the Ethernet protocol, the Token-Ring protocol, or other logical or physical networks such as the Internet or the World Wide Web.

When used in a networking environment, the computing device 100 is connected to the general network connection 171 through a network interface or adapter 170, which can be a network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that several of the acts and operation described hereinafter may also be implemented in hardware.

Figure 2:
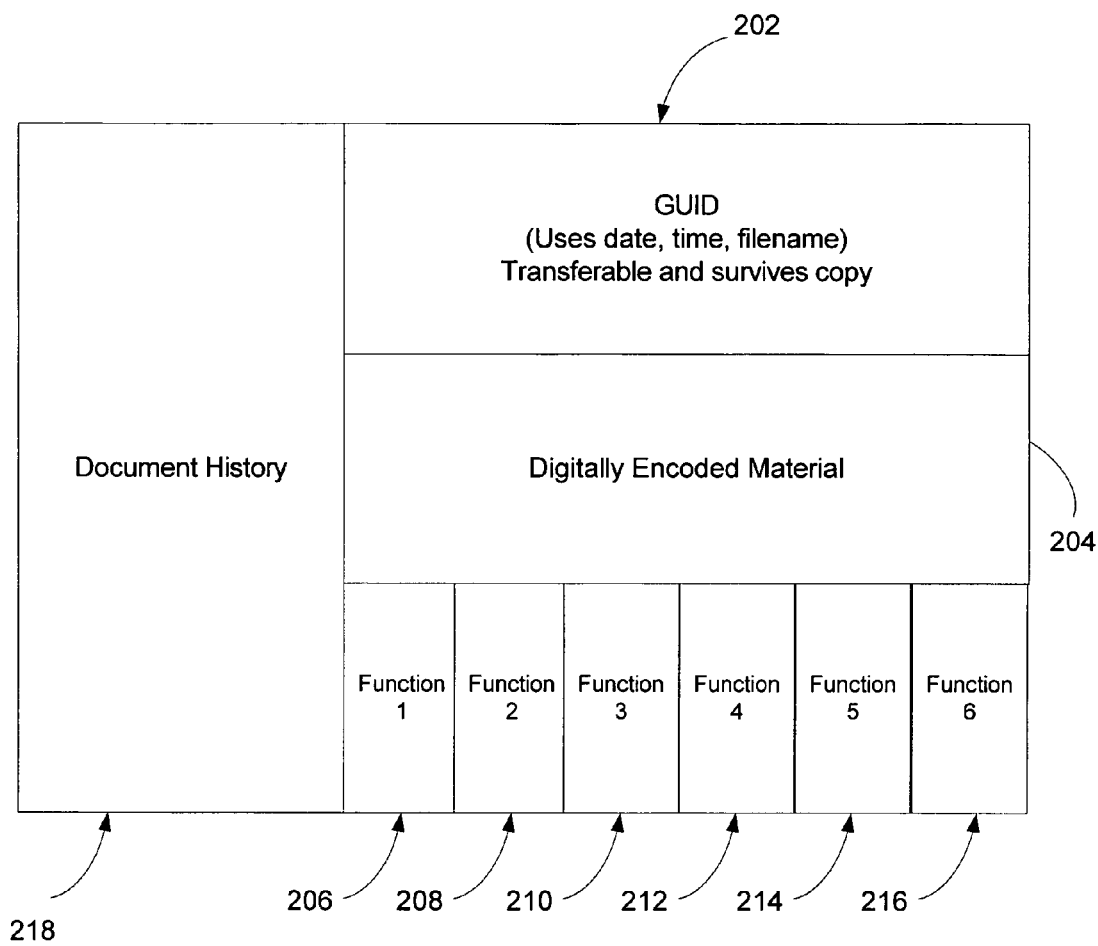
FIG. 2 is a block diagram of a three-component document in accordance with an embodiment of the present invention.

Turning to FIG. 2, an embodiment of the three component document is shown. The digitally-encoded material 204 can include but is not limited to machine-readable or human-readable text, bitmaps, graphics, streamed media, or a combination of same.

The unique ID 202 persists through the lifetime of the document. It persists despite changes to the digitally-encoded material, including material such as titles commonly used for identification, in copies or other works derived from the three element document, and in the sustained history of the three element document.

Built-in functions 206-216 represent the whole of the three element documents ability to be transformed or rendered. Rendering functions are those functions which allow the digitally encoded material to be accessed but do not change the form of the information. For example, playing digitally encoded music through a computer audio system is an example of rendering digitally encoded information. Transform functions are those that alter or transfer the digitally encoded information such as copying or editing. The digitally encoded material can only be acted upon in a meaningful way through these functions. The inability of outside functions to act upon the digitally encoded material can be enforced through strong encryption which may be present as one of the built in functions.

The functions are operations which may be performed on any or all components of the three component document. These operations may be in the form of rules, parameters, and/or executable code. The code could take the form of machine level instructions or higher level programs in various programming languages such as C, C++, Java, Visual Basic. These instructions could include scripts and may contain calls to operating system functions.

One built-in function transforms the entity by encrypting\decrypting it so that digitally-encoded material is not revealed to analysis tools such as debuggers when the digitally-encoded material is on permanent storage or in computer memory.

A list of several possible built-in functions is given in the following table:

that is auditable. An event reflects some change of state of the entity or some attempt to change the state of the entity, for example (1) a successful copy operation or (2) an attempt at a copy operation that a built-in function declined because of a license limitation. So that the record of an event persists even through power-off conditions, an event is logged by a built-in function to permanent storage, for example to a hard drive or optical disk, or to a platform separate from the platform where the entity exists, for example to a server within the same network or to a server within the Internet. The log of events is auditable by recording time, date, geographic, platform, and user information along with the change being logged.

Figure 3:
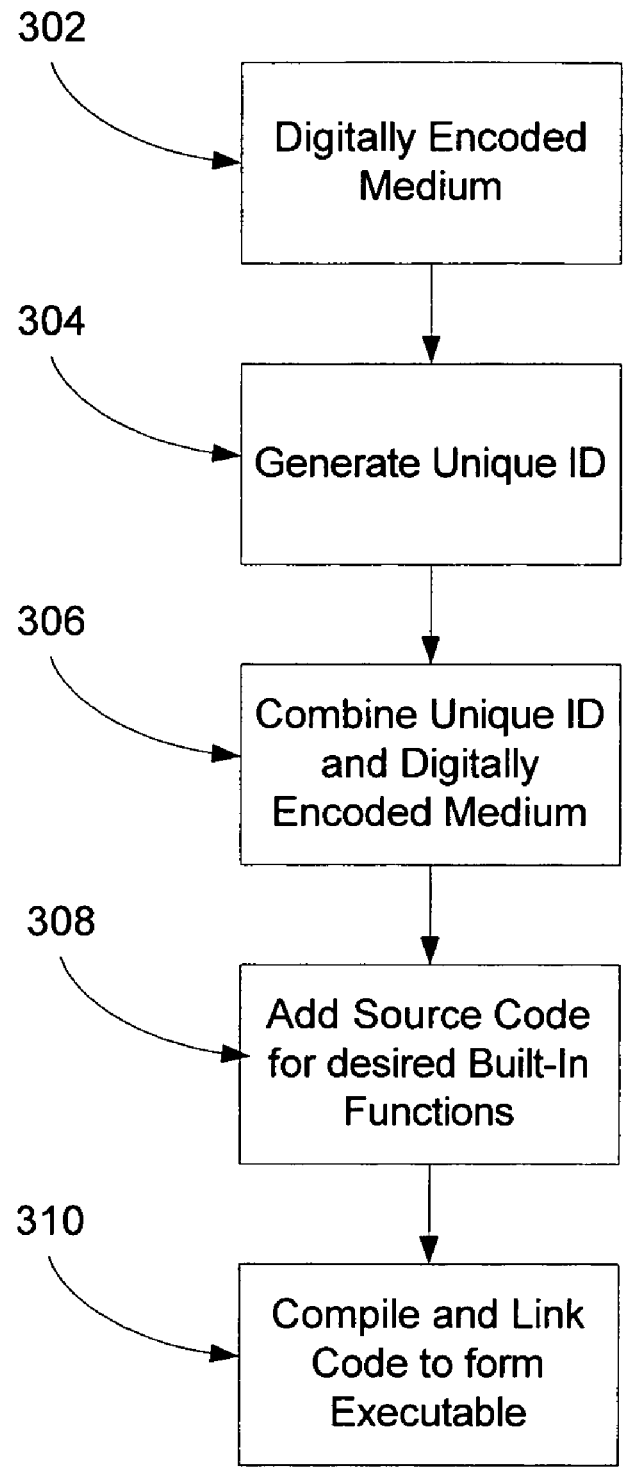
FIG. 3 is a flow diagram illustrating a method according to an embodiment of the present invention.

One embodiment of the creation of the three element document is illustrated in the flow diagram in FIG. 3. The process starts with any form of digitally encoded material in step 302. In block 304, a unique ID is created and appended to the digitally encoded material. In block 306 the combination of the unique ID and digitally encoded material are encrypted using a strong encryption process such as the Advanced Encryption Standard (AES). In block 308 source code is added for each built-in function. The encrypted data resulting from block 306 is included as a data segment with the source code. In block 310 the combined source code produced in block 308 is optionally compiled and linked to form an executable program. Many other embodiments exist, for example, block 310 may not be necessary if the source code is an interpreted language such as Java.

Figure 4:
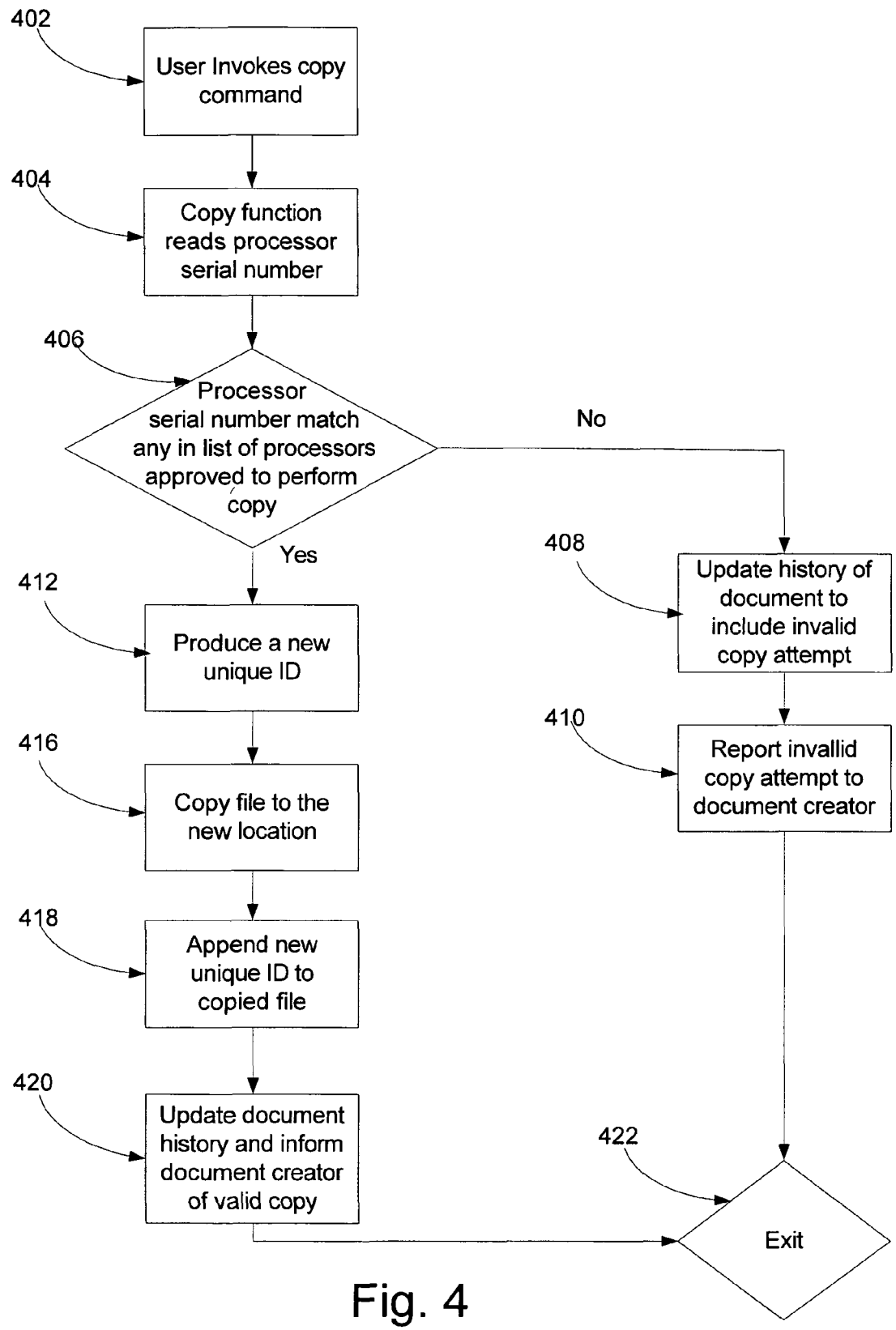
FIG. 4 is a flow diagram illustrating a copy command in accordance with an embodiment of the present invention.

Consider one embodiment of a copy command as shown in FIG. 4. In block 402, the user invokes a copy command. The

| | | |
|---|---|---|
| Render | Close | Finish rendering a view of the material. |
| | Find shape | Find a specified graphic element within the digitally-encoded material. |
| | Full screen | Maximize the render window within the limits of the current monitor. |
| | Go to | Move the current apparent point of view to a specified point within the material (for example "page 5"). |
| | Guides | Overlay the material with reference lines. |
| | Help | Display a reference source to help discover the available built-in functions. |
| | Open | Render a new view of the material. |
| | Order | Change the displayed sequence of the material. |
| | Pan | Move the apparent viewpoint across the material. |
| | Properties | Get or set properties visible if the material is displayed. Example properties are title; author; organization; keywords; resolution. |
| | Reveal | Make visible specified portions of the digitally-encoded material or specified built-in functions. |
| | Rotate or Flip | Change the displayed orientation of the material. |
| | Search | Find specified text string within the digitally-encoded material. |
| | Select | Select specified string or graphic elements. |
| | Size and Position | Change the render window size and position on the monitor. |
| | Spellcheck | Validate the material against a stored dictionary or rule set. |
| | Zoom | Change the apparent view size of the material (for example "50%"). |
| Transform | Copy | Create a copy of digitally-encoded material. |
| | DRM Agent | Maintain Digital Rights in the entity. |
| | Encrypt/decrypt | Encrypt to prevent parsing outside the entity. |
| | Export | Convert a copy of digitally-encoded material for use outside the entity. |
| | Insert | Create additional digitally-encoded material. |
| | Log | Permanently record a change-of-state event. |
| | New | Create a new entity or new digitally-encoded material in an entity. |
| | Paste | Insert a copy of digitally-encoded material. |
| | Print | Create a hard-copy of digitally-encoded material. |
| | Replace | Replace digitally-encoded material. |
| | Save As | Incorporate changes in an entity. |

Document history 218 may be encoded into the three element document as well. Document history is a log of events invocation could be through a GUI supported by a build in function or any other suitable means. In block 404, the built-in function copy reads the processor serial number. In block 406, the processor serial number is compared to a list of computers on which the copy function is allowed to operate. If the processor is not on the list, the user is informed in block 408 that a copy operation is not allowed on this processor. In block 410 the history of the document is updated to include the invalid copy attempt and in block 412 this failed attempt is reported to the document creator. In block 422, the copy return is exited.

If the processor ID is on the list of computers allowed to copy the document, block 414 produces a new unique ID. In block 416, the file is reproduced in the new location. In block 418, the new unique ID is appended to the copy of the file which now contains two unique IDs. In block 420, the successful copy operation is reported to the document creator and the history of both the new and original files are updated. In block 422, the copy return is exited.

The inclusion of the second unique ID allows the two files to be separately tracked in the future. Without this second unique ID, there would be no method to differentiate future operations performed on the two files.

One distinct security advantage gained by the use of built-in functions is that files do not have to be decrypted before loading into RAM. If the decrypted file exists in RAM, the contents can be read with programs known as debuggers can be used to view the decrypted data. With the use of built in functions, the data can be stored in RAM in encrypted form because the decryption can be integral to the function being performed.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method of storing digitally-encoded material, the method comprising:
   employing a processor to execute computer executable instructions stored in memory to perform the following acts:
      combining a unique identifier with the digitally-encoded material and encrypting the combination of the unique identifier and the digitally-encoded material, wherein the unique identifier persists throughout the lifetime of the digitally-encoded material, regardless of any changes made to any portion of the digitally-encoded material, and wherein the unique identifier further persists in copies and other derived digitally-encoded material that includes some but not all of the original digitally-encoded material as well as a portion of new digitally-encoded material not included in the copy, such that copies and derived digitally-encoded material include both the unique identifier of the digitally-encoded material and a new unique identifier for the copy or derived digitally-encoded material;
      associating one or more built-in functions with the encrypted digitally-encoded material such that the unique identifier and the built-in functions are coupled to the digitally-encoded material, the built-in functions governing transforms and rendering of the digitally-encoded material, wherein the digitally-encoded material can be transformed and rendered only by the built-in functions, wherein at least one of the built-in functions is configured to automatically notify a selected entity when a specified built-in function has been executed or when execution has been attempted, at least one of the built-in functions is configured to display the available built-in functions associated with the encrypted digitally-encoded material, and at least one of the built-in functions is configured to make visible one or more user-specified portions of the digitally-encoded material;
   storing a list of processors that are permitted to execute the built-in functions;
   receiving information regarding a first processor attempting to execute one or more of the built-in functions;
   verifying if the first processor attempting to execute the built-in functions is on the list of processors; and
   permitting the first processor to execute the one or more built-in functions if the processor is on the list else preventing the first processor from executing the one or more built-in functions.

2. The method of claim 1 further comprising:
   associating a history of the digitally-encoded material with the digitally-encoded material.

3. The method of claim 1 further comprising:
   associating a history of the digitally-encoded material, the history being located in a database.

4. The method of claim 1 wherein the built-in functions include one or more of Copy, Paste or Print.

5. The method of claim 1 further including an encrypt function and a decrypt function with the built-in functions that enables the digitally-encoded material to be stored in RAM in an encrypted form.

6. A method for tracking digitally-encoded material, the method comprising:
   employing a processor to execute computer executable instructions stored in memory to perform the following acts:
      appending a unique identifier to the digitally-encoded material, wherein the unique identifier persists throughout the lifetime of the digitally-encoded material, regardless of any changes made to any portion of the digitally-encoded material, and wherein the unique identifier further persists in copies and other derived digitally-encoded material that includes some but not all of the original digitally-encoded material as well as a portion of new digitally-encoded material not included in the copy, such that copies and derived digitally-encoded material include both the unique identifier of the digitally-encoded material and a new unique identifier for the copy or derived digitally-encoded material;
      encrypting a combination including the digitally-encoded material and the unique identifier; and
      appending built-in function source code to the encrypted combination to form an executable entity capable of being executed independent of a particular operating system, wherein the digitally-encoded material can be transformed and rendered only by the built-in functions, wherein at least one of the built-in functions is configured to automatically notify a selected entity when a specified built-in function has been executed or when execution has been attempted, at least one of the built-in functions is configured to display the available built-in functions associated with the encrypted digitally-encoded material, and at least one of the built-in functions is configured to make visible one or more user-specified portions of the digitally-encoded material;

receiving information regarding a disparate processor accessing the built-in function source code for execution;

allowing the disparate processor to execute a function associated with the built-in function source code if the disparate processor is included in a list of processors permitted to execute the function;

barring the disparate processor from executing the function associated with the built-in function source code if the disparate processor is not included in the list of processor permitted to execute the function.

7. The method of claim 6 wherein the built-in functions include one or more of Copy, Paste or Print.

8. The method of claim 6 wherein the built-in functions include rendering functions and transform functions.

9. The method of claim 8 wherein the rendering functions include one or more of close, find shape, full screen, go to, guides, help, open, order, pan, properties, reveal, rotate/flip, search, select, size and position, spell check, or zoom.

10. The method of claim 8 wherein the transform functions include one or more of copy, DRM Agent, export, insert, log, new, paste, print, replace, or save as.

11. The method of claim 10, including the copy function in the transform functions wherein upon executing the copy function a second unique identifier is generated and appended to a generated copy of the digitally encoded material such that the copy comprises the unique identifier and the second unique identifier.

12. The method of claim 11, wherein executing the copy function updates document history of the digitally encoded material and the generated copy and informs at least an author of the digitally encoded material of the generated copy.

13. A computer-readable storage device comprising: a document configured to enable tracking, and the following processor executable components:
    a unique identifier, wherein the unique identifier persists throughout the lifetime of the document, regardless of any changes made to any portion of the document, and wherein the unique identifier further persists in copies and other derived digitally-encoded material that includes some but not all of the original digitally-encoded material as well as a portion of new digitally-encoded material not included in the copy, such that copies and derived digitally-encoded material include both the unique identifier of the digitally-encoded material and a new unique identifier for the copy or derived digitally-encoded material;
    digitally-encoded material associated with the unique identifier;
    one or more built-in functions coupled to the digitally-encoded material, the built-in functions govern transforms and render the digitally-encoded material independent of a particular operating system, and wherein the digitally-encoded material can be transformed and rendered only by the built-in functions, wherein at least one of the built-in functions is configured to automatically notify a selected entity when a specified built-in function has been executed or when execution has been attempted, at least one of the built-in functions is configured to display the available built-in functions associated with the encrypted digitally-encoded material, and at least one of the built-in functions is configured to make visible one or more user-specified portions of the digitally-encoded material; and
    a list of processors associated with each of the built-in functions such that whenever a processor attempts to execute one or more of the built-in functions, it is verified if the processor is comprised within the list of processors before permitting the processor to carry out the one or more built-in functions, the processor is prevented from executing the one or more functions if it is not included in the list of processors associated with each of the one or more built-in functions.

14. The device of claim 13 wherein the document can be stored in encrypted form into RAM.

15. The device of claim 13 wherein the built-in functions include rendering functions and transform functions.

16. The device of claim 15 wherein the rendering functions include one or more of close, find shape, full screen, go to, guides, help, open, order, pan, properties, reveal, rotate/flip, search, select, size and position, spell check, or zoom.

17. The device of claim 15 wherein the transform functions include one or more of copy, DRM Agent, export, insert, log, new, paste, print, replace, or save as.

18. A computer readable storage device having computer-executable instructions to perform acts for storing digitally-encoded material, the acts comprising:
    associating a unique identifier with the digitally-encoded material, wherein the unique identifier persists throughout the lifetime of the digitally-encoded material, regardless of any changes made to any portion of the digitally-encoded material, and wherein the unique identifier further persists in copies and other derived digitally-encoded material that includes some but not all of the original digitally-encoded material as well as a portion of new digitally-encoded material not included in the copy, such that copies and derived digitally-encoded material include both the unique identifier of the digitally-encoded material and a new unique identifier for the copy or derived digitally-encoded material;
    associating a plurality of built-in functions with the digitally-encoded material such that the unique identifier and the built-in functions are coupled to the digitally-encoded material;
    associating a list of processors with each of the built-in functions such that only processors in the list associated with a particular built-in function are permitted to execute the built-in function;
    receiving information regarding at least a processor attempting to render or transform the digitally encoded material via one or more of the built-in functions;
    verifying if the processor is included in the list associated with each of the one or more built-in functions; and
    rendering or transforming the digitally-encoded material based on the built-in functions, if the processor is included in the list, wherein the digitally-encoded material can be transformed and rendered only by the built-in functions, wherein at least one of the built-in functions is configured to automatically notify a selected entity when a specified built-in function has been executed or when execution has been attempted, at least one of the built-in functions is configured to display the available built-in functions associated with the encrypted digitally-encoded material, and at least one of the built-in functions is configured to make visible one or more user-specified portions of the digitally-encoded material.

19. The computer readable device of claim 18 wherein the acts further comprise:
associating a history of the digitally-encoded material with the digitally-encoded material wherein the history is located in a database.

20. The computer readable device of claim 18 wherein the built-in functions include one or more of copy, paste, print, encrypt, or decrypt and the associating the built-in functions with the digitally-encoded material enables the digitally-encoded material to be stored in RAM in an encrypted form.

21. A computer readable device having computer-executable instructions to perform a method for tracking digitally-encoded material, the method comprising:
appending a unique identifier to the digitally-encoded material, wherein the unique identifier persists throughout the lifetime of the digitally-encoded material, regardless of any changes made to any portion of the digitally-encoded material, and wherein the unique identifier further persists in copies and other derived digitally-encoded material that includes some but not all of the original digitally-encoded material as well as a portion of new digitally-encoded material not included in the copy, such that copies and derived digitally-encoded material include both the unique identifier of the digitally-encoded material and a new unique identifier for the copy or derived digitally-encoded material;
encrypting a combination including the digitally-encoded material and the unique identifier;
forming an executable entity capable of being executed independent of a particular operating system by appending built-in function source code to the encrypted combination, wherein the digitally-encoded material can be transformed and rendered only by the built-in functions, wherein at least one of the built-in functions is configured to automatically notify a selected entity when a specified built-in function has been executed or when execution has been attempted, at least one of the built-in functions is configured to display the available built-in functions associated with the encrypted digitally-encoded material, and at least one of the built-in functions is configured to make visible one or more user-specified portions of the digitally-encoded material;
storing a list of processors that are permitted to execute the built-in functions;
receiving information regarding a first processor attempting to execute one or more of the built-in functions;
verifying if the first processor attempting to execute the built-in functions is on the list of processors;
permitting the first processor to execute the one or more built-in functions if the processor is on the list else preventing the first processor from executing the one or more built-in functions.

22. The computer readable device of claim 21 wherein the method further comprise:
tracking the digitally-encoded material by maintaining an auditable document history log.

23. The computer readable device of claim 22 wherein the auditable document history log is maintained in one of a file associated with the digitally-encoded material and a database independent of the digitally-encoded material.

* * * * *